(12) United States Patent
Hsu et al.

(10) Patent No.: US 7,657,036 B2
(45) Date of Patent: Feb. 2, 2010

(54) DETERMINING A SESSION ENCRYPTION KEY DURING A BROADCAST/MULTICAST SERVICE SESSION USING SECURE REAL-TIME TRANSPORT PROTOCOL

(75) Inventors: Raymond Tah-Sheng Hsu, San Diego, CA (US); Jun Wang, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 10/946,961

(22) Filed: Sep. 21, 2004

(65) Prior Publication Data

US 2006/0062393 A1    Mar. 23, 2006

(51) Int. Cl.
*H04L 9/00* (2006.01)
(52) U.S. Cl. .................................. 380/281
(58) Field of Classification Search .......... 380/281, 380/262
See application file for complete search history.

(56) References Cited

U.S. PATENT DOCUMENTS 7,234,063 B1 * 6/2007 Baugher et al. ............. 713/189

2005/0175175 A1 * 8/2005 Leech .......................... 380/29

OTHER PUBLICATIONS

Baugher D Mcgrew Cisco Systems et al., "The Secure Real-Time Transport Protocol (SRTP)", IETF Standard, Internet Engineering Task Force, IETF, CH, Mar. 2004 XP 015009491.
International Search Report—PCT/US2005/033735. International Search Authority—European Patent Office—Mar. 13, 2006.
Written Opinion—PCT/US2005/033735. International Search Authority—European Patent Office—Mar. 13, 2006.
International Preliminary Report on Patentability—PCT/US2005/033735, International Search Authority—The International Bureau of WIPO—Geneva, Switzerland—Mar. 27, 2007.
3GPP2 X.S0022 Version 1.0 3RD Generation Partnership Project 2 "3GPP2", "Broadcast and Multicast Service in cdma2000 Wireless IP network" Dec. 2004.

* cited by examiner

*Primary Examiner*—Andrew L Nalven
(74) *Attorney, Agent, or Firm*—Kent D. Baker; Won Tae C Kim

(57) ABSTRACT

Techniques are provided for determining an updated session encryption key. According to one embodiment, a packet index can be computed using a sequence number received in a session data packet during a SRTP session and a predetermined value. The predetermined value can be, for example, a non-zero value from a roll-over-counter that has been set to the non-zero value. The updated session encryption key can then be determined using a master key received from a BCMCS controller and the packet index. The determined updated session key is used to encrypt or de-encrypt content provided by a content server.

39 Claims, 6 Drawing Sheets

US 7,657,036 B2

DETERMINING A SESSION ENCRYPTION KEY DURING A BROADCAST/MULTICAST SERVICE SESSION USING SECURE REAL-TIME TRANSPORT PROTOCOL

BACKGROUND

1. Field

The invention relates generally to wireless communication, and more specifically to broadcast/multicast services.

2. Background

Broadcast, or multicast services, refers to a communication system used to transmit information from a transmitter to multiple receivers or users. Examples of broadcast, or point-to-multipoint communication systems, include dispatch systems, such as used by police, trucking companies, and taxi companies where a central dispatcher broadcasts signals to one or more vehicles. A broadcast signal may be directed to a specific vehicle or to all vehicles simultaneously.

As mobile radio networks have become commonplace, such as cellular telephone networks, customers have begun to desire to receive broadcast of multimedia, such as video and teleconferencing, using Internet Protocol (IP) over a wireless communication link. For example, customers desire to be able to receive streaming video, such as television broadcast, on their cell phone or other portable wireless communication device. Other examples of the type of data that customers desire to receive with their wireless communication device include multimedia broadcast and Internet access.

A typical wireless communication channel has limited bandwidth and at times may experience significant error rates. Various techniques for transmitting messages according to broadcast and multicast services (BCMCS) have been developed. In general, these techniques include formatting the message data into packets with a header that includes information about the data within the packet. In BCMCS communications, a content provider, or content server, generates a data stream to be broadcast to multiple receivers, or users. The data stream is converted to data packets to make up a BCMCS data stream that is then broadcast to multiple communication devices simultaneously.

It may be desired that only some WCDs receive BCMCS streams. For example, a content provider may desire that only authorized WCDs, such as ones that have paid a subscription fee, be able to receive the content. Because the BCMCS streams are broadcast through the air, and therefore may be received by both authorized and unauthorized WCDs, different ways to secure the BCMCS streams have been developed.

A protocol for secure transmission of data, including BCMCS streams, that has been developed by the Third Generation Partnership Project Two (3GPP2) is known as the Secure Real-time Transport Protocol (SRTP). In a SRTP broadcast, session keys that are used to de-crypt the BCMCS stream are generated from a master key, packet index (PI), and other key generation materials. Because the session key is used to decrypt the broadcast stream, periodically during a SRTP broadcast the session key is updated to a new value to prevent unauthorized WCDs from receiving the content. Updating of the session key requires coordination between the provider of the broadcast stream and the authorized WCDs. In addition, increasing the randomness of the updated session key is desirable, thereby making it more difficult for an unauthorized WCD to determine what the new session new is.

There is therefore a need in the art for improving the updating of the session key in a SRTP BCMCS session.

SUMMARY

Embodiments disclosed herein address the above stated needs by providing improved techniques for updating of a session key during a SRTP BCMCS session. Methods and apparatuses are provided for determining a session encryption key during a Broadcast/Multicast Service (BCMCS) using Secure Real-time Transport Protocol (SRTP).

According to one aspect, techniques are provided for determining an updated session encryption key in which a packet index is computed using a sequence number received during a session and a predetermined value. The updated session encryption key can then be determined using a master key and the packet index.

According to one embodiment, a packet index can be computed using a sequence number received in a session data packet during a SRTP session and a predetermined value. The predetermined value can be, for example, a non-zero value from a roll-over-counter that has been set to the non-zero value. The updated session encryption key can then be determined using a master key received from a BCMCS controller and the packet index. The determined updated session key is used to encrypt or de-encrypt content provided by a content server. This can be performed at a content server, or at a mobile station, or both.

Another aspect is that an initial session key can be computed using the packet index using the sequence number and a roll-over-counter that has been set to a predetermined, non-zero, value. An initial session key is determined using the master key and the packet index. Determining the initial session key can be performed at a content server, or at a mobile station, or both.

A session key can be determined by an encryption key engine that can include, for example, a receiver that receives a sequence number during a session and a processor that computes a packet index value during the session using the sequence number and a predetermined value from a roll-over counter. The processor can then generate an updated session encryption key using a master key and the packet index.

Other features and advantages of the present invention should be apparent from the following description of exemplary embodiments, which illustrate, by way of example, aspects of the invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
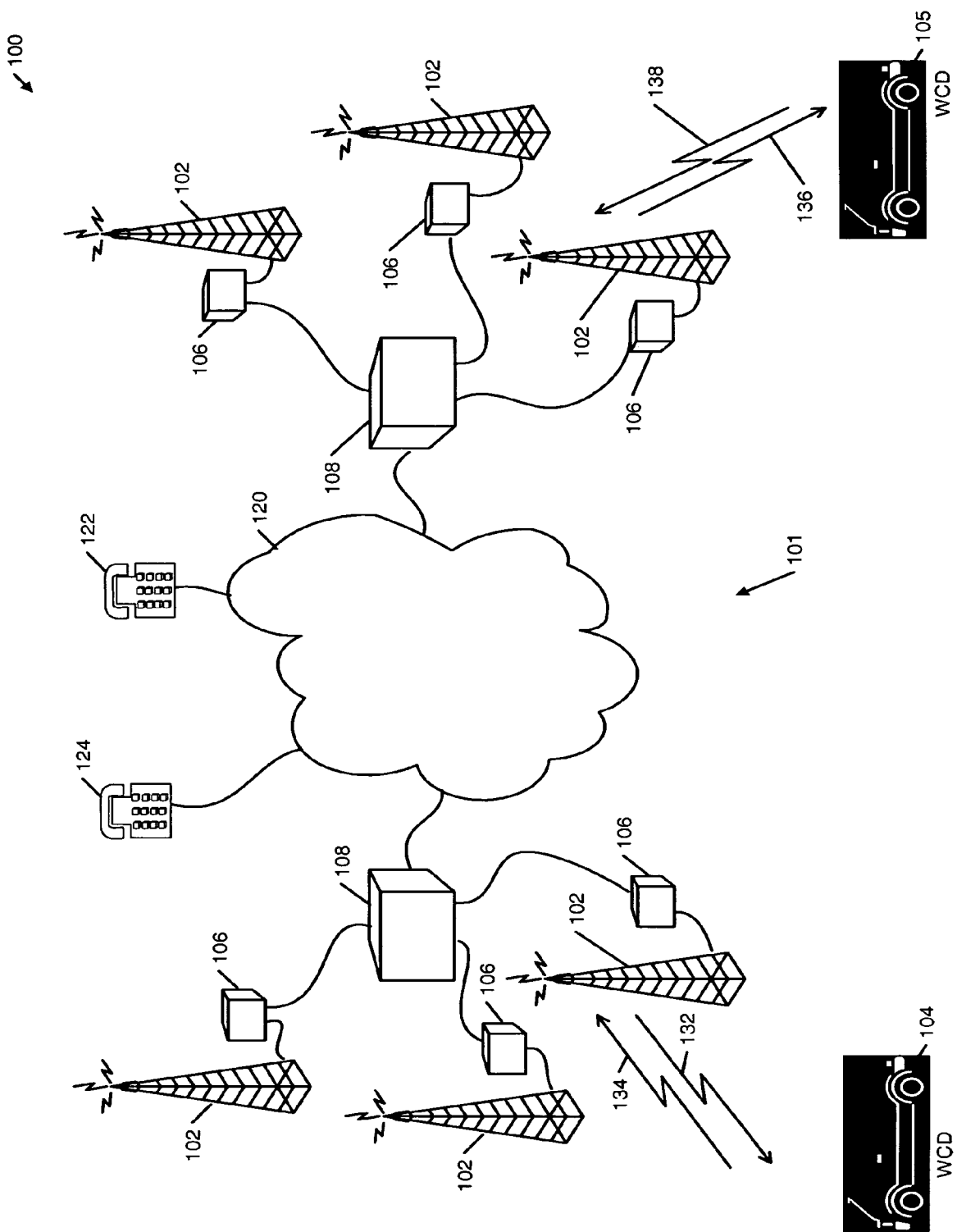
FIG. 1 shows a communication system constructed in accordance with the present invention.

FIG. 1 shows a communication system 100 constructed in accordance with the present invention. The communication system 100 includes infrastructure 101, multiple wireless communication devices (WCD) 104 and 105, and landline communication devices 122 and 124. The WCDs will also be referred to as mobile stations or mobiles. In general, WCDs may be either mobile or fixed.

The infrastructure 101 also includes other components, such as base stations 102, base station controllers 106, mobile switching centers 108, a switching network 120, and the like. In one embodiment, the base station 102 is integrated with the base station controller 106, and in other embodiments the base station 102 and the base station controller 106 are separate components. Different types of switching networks 120 may be used to route signals in the communication system 100, for example, the switching network 120 may be the public switched telephone network (PSTN).

The term "forward link" refers to the signal path from the infrastructure 101 to a WCD 104 and 105, and the term "reverse link" refers to the signal path from a WCD to the infrastructure. As shown in FIG. 1, WCDs 104 and 105 receive signals 132 and 136 on the forward link and transmit signals 134 and 138 on the reverse link. In general, signals transmitted from a WCD are intended for reception at another communication device, such as another remote unit, or a landline communication device 122 and 124, and are routed through the switching network 120. For example, if the signal 134 transmitted from an initiating WCD 104 is intended to be received by a destination WCD 105, the signal is routed through the infrastructure 101 and a signal 136 is transmitted on the forward link to the destination WCD 105. Typically, a communication device, such as a WCD or a landline communication device, may be both an initiator of and a destination for the signals.

Examples of WCDs 104 and 105 include cellular telephones, wireless communication enabled personal computers, and personal digital assistants (PDA), and other wireless communication devices. The communication system 100 may be designed to support one or more wireless standards. For example, the standards may include standards referred to as TIA/EIA-95-B (IS-95), TIA/EIA-98-C (IS-98), cdma2000, Wideband CDMA (WCDMA), and others.

Signals can also be transmitted from the infrastructure 101 to the WCDs 104 and 105. For example, a signal can be broadcast from a content server in the infrastructure to authorized WCDs.

The Third Generation Partnership Project Two (3GPP2) has published a specification, 3GPP2 X.S0022, that defines requirements for support of the Broadcast-Multicast Service (BCMCS) for cdma2000 networks, incorporated herein in its entirety. The specification states that the network operator can control encryption of the content of a BCMCS stream to protect against unauthorized reception. One such encryption technique is the Secure Real-time Transport Protocol (SRTP).

The SRTP is described in a Network Working Group Request for Comments (RFC) 3711, incorporated herein in its entirety. A copy of RFC 3711 is available at the Internet address of ftp.rfc-editor.org/in-notes/rfc3711.txt. RFC 3711 describes that each SRTP stream requires a sender and a receiver to maintain cryptographic state information, referred to as the cryptographic context.

SRTP uses two types of keys, a session key and a master key. The session key is used directly in a cryptographic transform, such as encryption and decryption. The master key is a random number that is used in deriving the session key. An initial session key is derived at the beginning of a broadcast using SRTP, and then subsequent session keys are refreshed, or updated, according to a Key Derivation Rate (KDR). The KDR is set to a value corresponding to a number of packets that are broadcast with a particular session key before the session key is refreshed, or updated. In other words, an initial session key is derived, and then periodically, throughout the session, the session key used to encrypt the data is updated, or changed, to prevent unauthorized access to the broadcast content.

Figure 2:
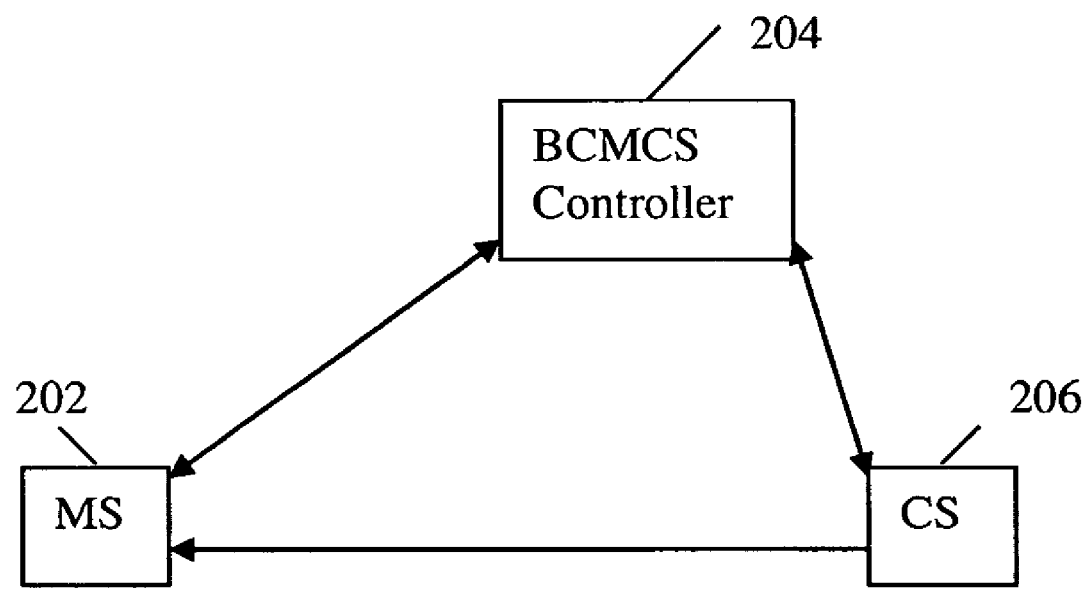
FIG. 2 is a block diagram illustrating an exemplary architecture for transmission of BCMCS using SRTP over a wireless network.

FIG. 2 is a block diagram illustrating an exemplary architecture for transmission of BCMCS using SRTP over a wireless network. As shown in FIG. 2, a mobile station (MS) 202 may obtain security-related parameters from the BCMCS Controller 204 via an out-of-band mechanism. The MS 202 then receives program content, that has been encrypted using a session key, from a content server (CS) 206. The MS 202, using the correct session key, can decrypt the content. Coordination between the CS 206 and BCMCS Controller 204 may be required to support higher-layer encryption.

The master key is shared between the CS 206 and a group of MSs 202 that are authorized to receive a specific content from the CS 206. As noted, the master key is used to derive the session key.

Figure 3:
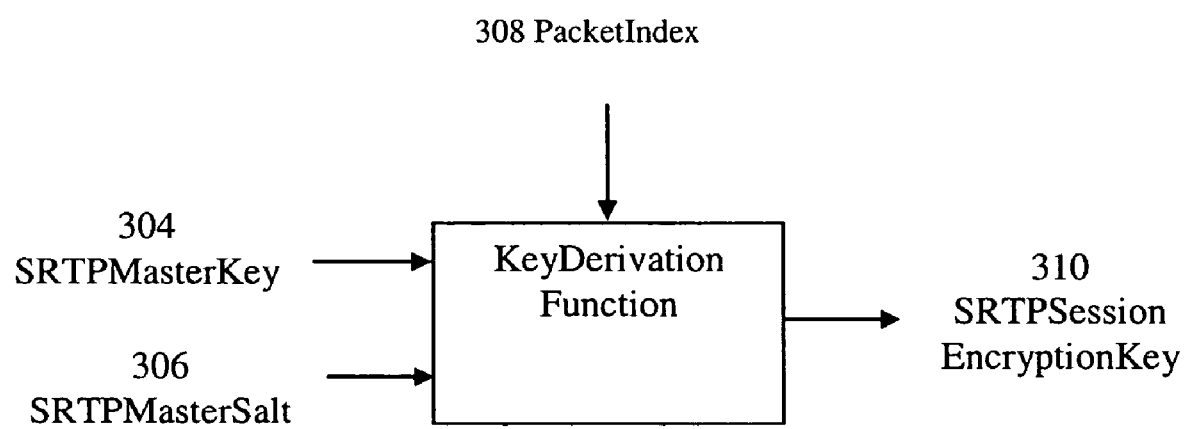
FIG. 3 is a block diagram illustrating the derivation of a session key.

FIG. 3 is a block diagram illustrating the derivation of a session key. As shown in FIG. 3, a Key Derivation Function 302 receives the master key 304, a master salt 306, and a packet index (PI) 308. The key derivation function 302 uses these inputs to derive a session key 310. The master salt 306 is a random number that is known to the content server 206 (FIG. 2) and the MS 202.

The PI 308 is calculated by the equation $$PI = 2^{16} * ROC + SEQ \qquad \text{Eq. 1}$$

where SEQ is the Real-time Transport Protocol (RTP) sequence number, that is defined in RFC 3711 to be a 16-bit number. ROC is the Roll-Over Counter which counts the number of times the RTP sequence number rolls over. The ROC is defined in RFC 3711 to be a 32-bit number. SEQ is incremented by one for every RTP packet sent. Typically, the initial session key is derived using an initial value of ROC that is set to zero, and an initial value of SEQ that can be a random number. In one embodiment, the initial value of the ROC may be set to a predetermined, non-zero value. For example, an initial non-zero ROC value may be shared between the CS 206 and a group of MSs 202 that are authorized to receive a specific content from the content server. Or, an initial non-zero ROC value may be provided via an out-of-band mechanism from the BCMCS controller prior to the beginning of a broadcast.

Subsequent session keys are refreshed, or updated, according to a Key Derivation Rate (KDR). The KDR is expressed in terms of the number of SEQ increment. For example, if KDR is 100, the session keys must be refreshed at the rate of every 100 RTP packets sent by the CS. The CS and MSs need to know the KDR in order to synchronize the generation of subsequent session keys. Based on the KDR and the received SEQ, the MS knows whether or not the session keys need to be refreshed.

As described in RFC 3711, because the ROC is 32 bits long and SEQ is 16 bits long, the maximum number of packets belonging to a given SRTP stream that can be secured with the same session key is $2^{48}$ packets. After that number of SRTP packets have been sent with a given key, either a master key or a session key, the CS must not send any more packets with that key.

A technique for determining a session encryption key is described below. A sequence number is received with each packet during a session. A packet index is determined using the received sequence number and the value of the ROC that has been set to a predetermined value, for example a non-zero value or a zero value. The session key is then determined using a master key and the packet index.

This technique can be used to determine an initial session key at the beginning of a broadcast. For example, the CS and authorized MSs can share a predetermined, non-zero value for ROC that is used to determine the initial session key. Likewise, a BCMCS controller can provide the CS and authorized MSs with the predetermined, non-zero, value of ROC, for example, via an out-of-band mechanism. During the session, as packets are received, the value of the ROC will change as the RTP sequence number rolls over.

This technique can also be used during a master key refresh sequence. For example, before the current master key expires, the MS may obtain a new master key, a predetermined value for ROC, and a new initial RTP sequence number from the BCMCS Controller. The BCMCS Controller can coordinate with the CS for the new master key, the predetermined value for ROC, and the new initial RTP sequence number. The time when the new master key will be used may also conveyed to both the MS and CS. When that time comes, the CS computes the packet index using the predetermined ROC value and the new initial RTP sequence number; then, the CS derives the session keys using the new master key and the packet index. When the MS receives the packet with the new initial RTP sequence number, it computes the packet index with the predetermined ROC value and then derives the session keys using the new master key.

Another aspect, corresponding lists of predetermined values for ROC may be maintained in the CS and authorized MSs. Then, at desired times during the session a new predetermined value for ROC may be used. For example, when the CS and authorized MSs receive the master key they may also receive a list of predetermined values for ROC. Then during the session the CS and MS will use a corresponding new predetermined value for ROC. There are many ways of coordinating when the CS and MS would us a new predetermined value for ROC. For example, the CS and MS could use a new predetermined value fro ROC at preset time intervals, after a preset number of packets have been received, whenever a new session key is determined, when commanded via an out-of-band signal, when a command is included within the broadcast itself, and the like.

Figure 4:
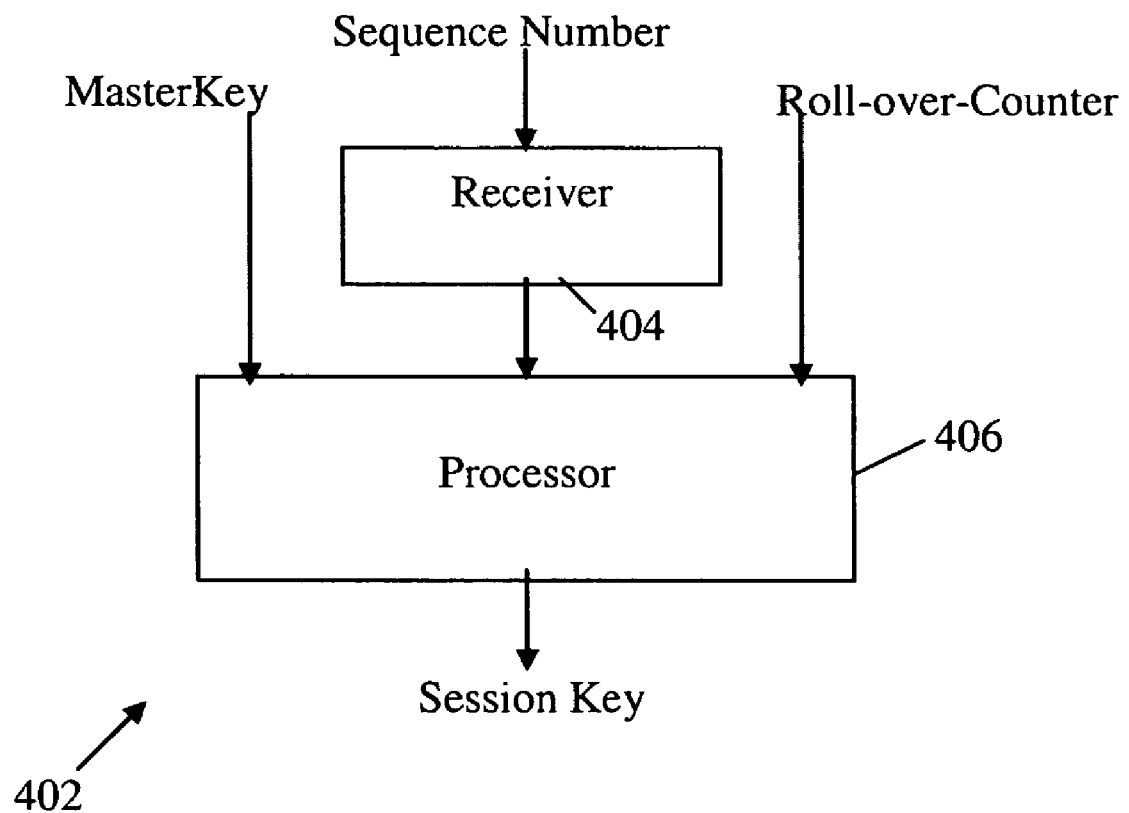
FIG. 4 is a block diagram of an exemplary encryption key engine.

FIG. 4 is a block diagram of an exemplary encryption key engine 402. Determining a session key can be done by an encryption key engine 402 that includes a receiver 404 and a processor 406. In one embodiment, the receiver 404 is configured to receive a master key, at least one predetermined ROC value, and an initial sequence number prior to the beginning of a session, for example, from an BCMCS controller. The receiver may also be configured to receive sequence numbers that are included within packets during a session. The processor 406 may be configured to compute a packet index using the sequence number and a ROC value. The ROC value may be one of the predetermined values receiver prior to beginning of the session, or some other predetermined value that is coordinated between a CS and an authorized MS. The ROC value will change during a session as packets are received and the sequence number rolls over. The processor 404 then determines the encryption key using the master key and the packet index.

Figure 5:
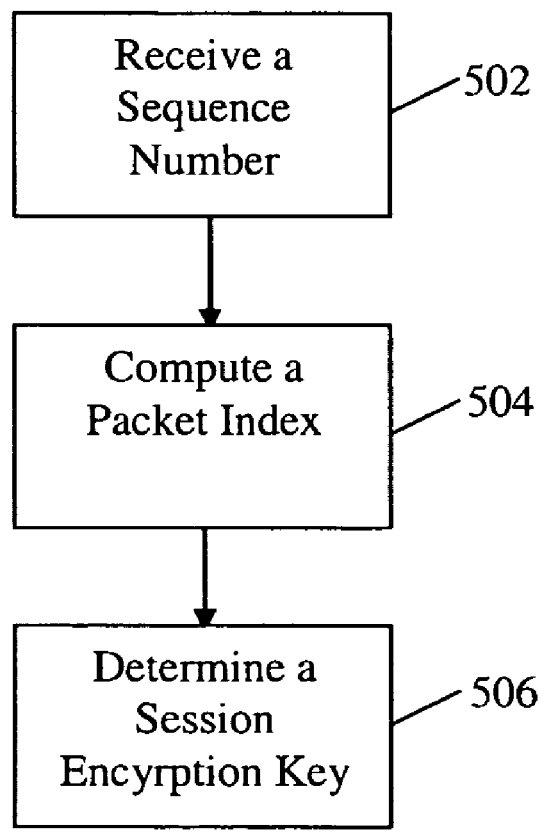
FIG. 5 is a flow chart illustrating an exemplary technique for determining a session encryption key.

FIG. 5 is a flow chart illustrating an exemplary technique for determining a session encryption key. Flow begins in block 502 where a sequence number is received. For example, the sequence number could be received from a BCMCS controller. Flow continues to block 504 where a packet index is computed using the sequence number and a roll-over counter having a predetermined value. For example, the roll-over counter (ROC) value can have a predetermined value, or the ROC value may be one of at least one predetermined values receiver prior to beginning of the session, or some other predetermined value that is coordinated between a CS and an authorized MS. The ROC value will change during a session as packets are received and the sequence number rolls over. Flow then continues to block 506 where a session encryption key is determined using a master key and the packet index.

EXEMPLARY MS

Figure 6:
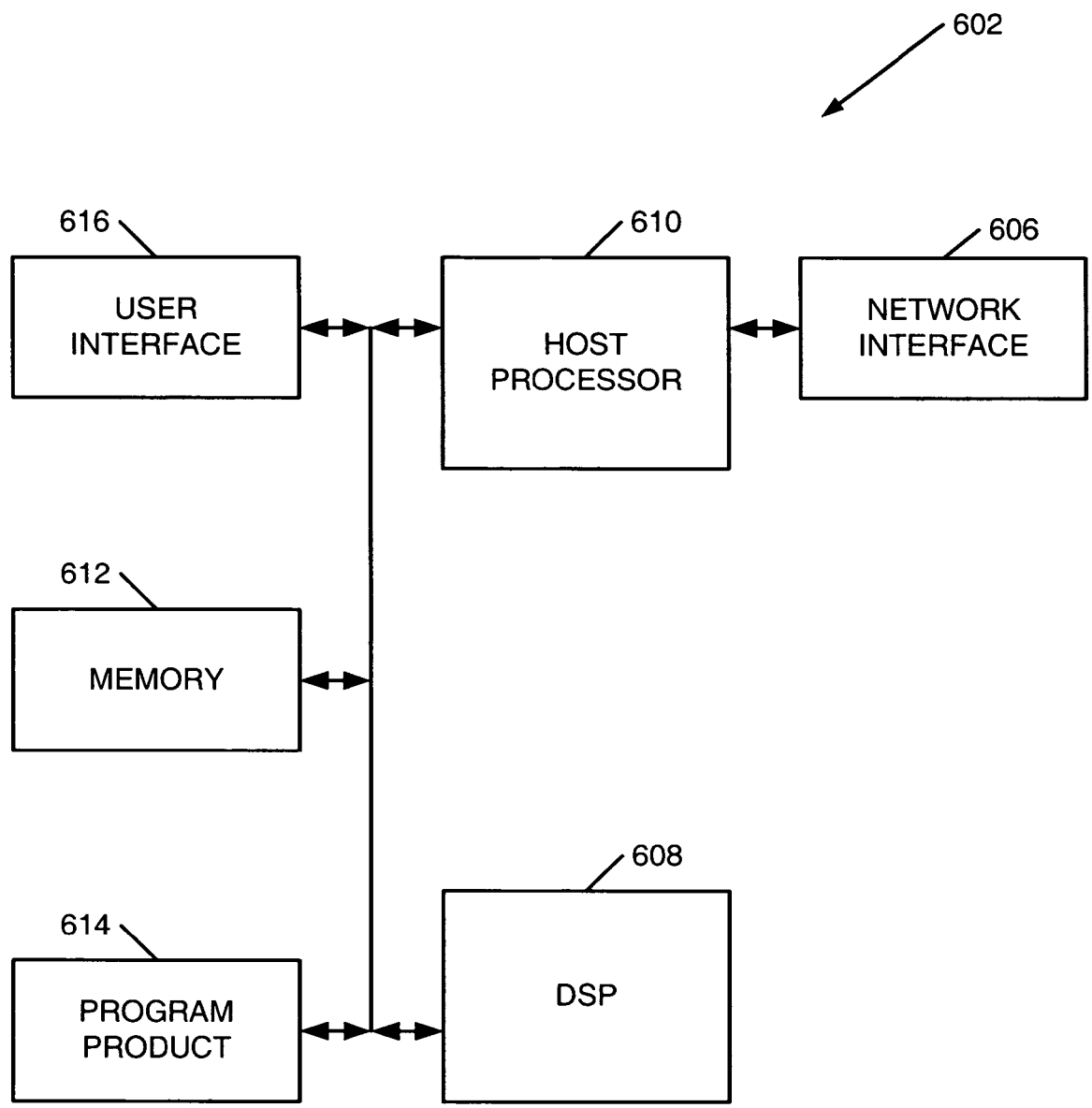
FIG. 6 is a block diagram of a wireless communication device, or MS, constructed in accordance with an exemplary embodiment of the present invention.

FIG. 6 is a block diagram of a wireless communication device, or MS, constructed in accordance with an exemplary embodiment of the present invention. The communication device 602 includes a network interface 606, digital signal processor (DSP) 608, a host processor 610, a memory device 612, a program product 614, and a user interface 616.

Signals from the infrastructure, such as BCMCS streams, are received by the network interface 606 and sent to the host processor 610. The host processor 610 receives the signals and, depending on the content of the signal, responds with appropriate actions. For example, the host processor 610 may determine that the signal includes a master key and at least one predetermined ROC values and the host processor 610 may store these values, for example in the memory device 612, for later use in determining a session encryption key. The host processor 610 may also determine that the signal is part of an SRTP BCMCS packet and it may extract a sequence number value from the packet. The host processor may then determine a session encryption key to decrypt the contents of a data packet received itself, or it may route the received data packet to the DSP 608 where the session encryption key is determined. The host processor 610 may also receive data packets from the DSP 608 and route these packets to the network interface 606 for transmission to the infrastructure.

Likewise, the signals received from the network interface 606 may be sent to the DSP 608. The DSP 608 may receive the signals and, depending on the content of the signal, responds with appropriate actions. For example, the DSP 608 may determine that the signal includes a master key and at least one predetermined ROC values and the DSP 608 may store these values, for example in the memory device 612, for later use in determining a session encryption key. The DSP 608 may also determine that the signal is part of an SRTP BCMCS packet and it may extract a sequence number value from the packet. The DSP 608 may then determine a session encryption key to decrypt the contents of a data packet received itself, or it may route the received data packet to the host processor 610 where the session encryption key is determined. The DSP 608 may also receive data packets from the host processor 610 and route these packets to the network interface 606 for transmission to the infrastructure.

In one embodiment, the network interface 606 may be a transceiver and an antenna to interface to the infrastructure over a wireless channel. In another embodiment, the network interface 606 may be a network interface card used to interface to the infrastructure over landlines.

Both the host processor 610 and the DSP 608 are connected to a memory device 612. The memory device 612 may be used to store data during operation of the WCD, as well as store program code that will be executed by the host processor 610 or the DSP 608. For example, the master key and at least one predetermined ROC value may be stored in memory device 612. Also, the host processor, DSP, or both, may operate under the control of programming instructions that are temporarily stored in the memory device 612. The host processor and DSP also can include program storage memory of their own, as well as storage for storing the master key and at least one predetermined ROC value. When the programming instructions are executed, the host processor 610 or DSP 608, or both, perform their functions, such as determining a session encryption key. The programming steps may be received from a program product 614. The program product 614 may store and transfer the programming steps into the memory 612 for execution by the host processor, CPU, or both.

The program product 614 may be semiconductor memory chips, such as RAM memory, flash memory, ROM memory, EPROM memory, EEPROM memory, registers, as well as other storage devices such as a hard disk, a removable disk, a CD-ROM, or any other form of storage medium known in the art that may store computer readable instructions. Additionally, the program product 614 may be the source file including the program steps that is received from the network and stored into memory and is then executed. In this way, the processing steps necessary for operation in accordance with the invention may be embodied on the program product 614. In FIG. 6, the exemplary storage medium is shown coupled to the host processor such that the host processor may read information from, and write information to, the storage medium. Alternatively, the storage medium may be integral to the host processor.

The user interface 616 is connected to both the host processor 610 and the DSP 608. For example, the user interface may include a keypad, or special function keys or buttons, that are routed to the host processor 610 and may be used by a user to request specific operation by the initiating device. The user interface 616 may also include a speaker that is connected to the DSP 610 and used to output audio data to the user.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or techniques described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, DVD storage, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of determining updated session encryption keys comprising:
   providing a list of predetermined values;
   receiving sequence numbers during a session;
   determining updated session encryption keys using a master key and packet index values computed using the received sequence values and incrementing counter values from a roll-over counter that had been set to a predetermined value from the list; and
   at desired times, resetting the incrementing counter value of the roll-over counter to a next predetermined value from the list, and continuing to determine updated session values using the master key and packet index values computed using the received sequence values and incrementing counter values from the roll-over counter having been reset to the next predetermined value from the list.

2. A method as defined in claim 1, wherein the session is an SRTP session.

3. A method as defined in claim 1, wherein the determined updated session keys are used to encrypt content provided by a content server.

4. A method as defined in claim 1, wherein the master key is received from a BCMCS controller.

5. A method as defined in claim 1, wherein determining the updated session encryption keys is performed at a content server.

6. A method as defined in claim 1, wherein determining the updated session encryption keys is performed at a mobile station.

7. A method as defined in claim 6, wherein the determined updated session keys are used to de-encrypt content provided by a content server.

8. A method as defined in claim 6, wherein the sequence numbers are received in session data packets.

9. A method as defined in claim 8, wherein the desired times are based on a preset number of received packets.

10. A method as defined in claim 1, wherein the desired times are based on preset time intervals.

11. A method as defined in claim 1, wherein each of the predetermined values in the list has a non-zero value.

12. An encryption key engine comprising:
a memory configured to store a list of predetermined values;
a receiver configured to receive sequence numbers during a session;
a processor configured to;
determine updated session encryption keys using a master key and packet index values computed using the received sequence values and incrementing counter values from a roll-over counter that had been set to a predetermined value from the list; and
at desired times, reset the incrementing counter value of the roll-over counter to a next predetermined value from the list, and continue to determine updated session values using the master key and packet index values computed using the received sequence values and incrementing counter values from the roll-over counter having been reset to the next predetermined value from the list.

13. An encryption key engine as defined in claim 12, wherein the session is an SRTP session.

14. An encryption key engine as defined in claim 12, wherein the determined session keys are used to encrypt content provided by a content server.

15. An encryption key engine as defined in claim 14, wherein the master key is received from a BCMCS controller.

16. An encryption key engine as defined in claim 12, wherein determining the updated session encryption keys is performed at a content server.

17. An encryption key engine as defined in claim 12, wherein determining the updated session encryption keys is performed at a mobile station.

18. An encryption key engine as defined in claim 17, wherein the determined updated session keys are used to de-encrypt content provided by a content server.

19. An encryption key engine as defined in claim 17, wherein the sequence numbers are received in session data packets.

20. An encryption key engine as defined in claim 19, wherein the desired times are based on a preset number of received packets.

21. An encryption key engine as defined in claim 12, wherein the desired times are based on preset time intervals.

22. An encryption key engine as defined in claim 12, wherein each of the predetermined values in the list has a non-zero value.

23. A computer readable media embodying a method of determining, an updated session encryption key comprising:
a recordable media; and
instructions recorded on the media that when read by a computer cause the computer to perform operations comprising:
providing a list of predetermined values;
receiving sequence numbers during a session;
determining updated session encryption keys using a master key and packet index values computed using the received sequence values and incrementing counter values from a roll-over counter that had been set to a predetermined value from the list; and
at desired times, resetting the incrementing counter value of the roll-over counter to a next predetermined value from the list, and continuing to determine updated session values using the master key and packet index values computed using the received sequence values and incrementing counter values from the roll-over counter having been reset to the next predetermined value from the list.

24. A computer readable media as defined in claim 23, wherein the session is an SRTP session.

25. A computer readable media as defined in claim 23, wherein the sequence numbers are received in session data packets.

26. A computer readable media as defined in claim 25, wherein the desired times are based on a preset number of received packets.

27. A computer readable media as defined in claim 23, wherein the desired times are based on preset time intervals.

28. A computer readable media as defined in claim 23, wherein each of the predetermined values in the list has a non-zero value.

29. An apparatus, comprising:
means for providing a list of predetermined values;
means for receiving sequence numbers during a session;
means for determining updated session encryption keys using a master key and packet index values computed using the received sequence values and incrementing counter values from a roll-over counter that had been set to a predetermined value from the list; and
means for resetting, at desired times, the incrementing counter value of the roll-over counter to a next predetermined value from the list, and continuing to determine updated session values using the master key and packet index values computed using the received sequence values and incrementing counter values from the roll-over counter having been reset to the next predetermined value from the list.

30. An apparatus as defined in claim 29, wherein the session is an SRTP session.

31. An apparatus as defined in claim 29, wherein the determined session keys are used to encrypt content provided by a content server.

32. An apparatus as defined in claim 31, wherein the master key is received from a BCMCS controller.

33. An apparatus as defined in claim 29, wherein the means for determining the updated session encryption keys is located at a content server.

34. An apparatus as defined in claim 29, wherein the means for determining the updated session encryption keys is located at a mobile station.

35. An apparatus as defined in claim 29, wherein the determined updated session keys are used to do-encrypt content provided by a content server.

36. An apparatus as defined in claim 29, wherein the sequence numbers are received in session data packets.

37. An apparatus as defined in claim 36, wherein the desired times are based on a preset number of received packets.

38. An apparatus as defined in claim 29, wherein the desired times are based on preset time intervals.

39. An apparatus as defined in claim 29, wherein each of the predetermined values in the list has a non-zero value.

* * * * *

UNITED STATES PATENT AND TRADEMARK OFFICE
CERTIFICATE OF CORRECTION

| | | |
|---|---|---|
| PATENT NO. | : 7,657,036 B2 | Page 1 of 1 |
| APPLICATION NO. | : 10/946961 | |
| DATED | : February 2, 2010 | |
| INVENTOR(S) | : Hsu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1138 days.

Signed and Sealed this

Twenty-eighth Day of December, 2010

David J. Kappos
*Director of the United States Patent and Trademark Office*